United States Patent Office 2,722,340
Patented Nov. 1, 1955

2,722,340

3,3-BIS(CHLOROMETHYL)OXETANE COATED ARTICLES AND METHOD OF COATING

George B. Feild, New Castle County, and William H. Markwood, Jr., Wilmington, Del., and George M. Taylor, Kennett Square, Pa., assignors to Hercules Powder Company, Wilmington, Del., a corporation of Delaware No Drawing. Application September 2, 1954, Serial No. 453,938

15 Claims. (Cl. 220—64)

This invention relates to articles coated with a plastic film and, more particularly, to articles, the surfaces of which are coated with a film comprising a polymer of 3,3-bis(chloromethyl)oxetane.

In accordance with this invention, it has been found that polymers of 3,3-bis(chloromethyl)oxetane having a molecular weight of at least 10,000 have physical properties that are highly desired in protective coatings for metallic and other surfaces, and compositions containing these polymers may be used for coating metallic surfaces as, for example, iron, steel, aluminum, copper, tin plate, etc., cellulosic surfaces such as wood, paper, cardboard, cotton cloth or webbing, etc., glass, glass fibers, asbestos, textiles, and many other types of surfaces, if after applying the coating to the surface of the article, the coating is fused by heating it to a temperature above the softening point of the polymer. This fusion of the coating to the surface not only causes the coating to adhere to the surface, but also improves the integrity of the coating. Articles so coated with a film of a polymer of 3,3-bis(chloromethyl)oxetane have a high degree of chemical resistance, are not attacked by most solvents, and are impervious to water, air, etc. Hence, polymers of 3,3-bis(chloromethyl)oxetane when applied in this manner may be used for both the internal and external coating of chemical reactors, piping, metal containers, cardboard containers, etc.

Any polymer of 3,3-bis(chloromethyl)oxetane, which may also be called 3,3-bis(chloromethyl)oxacyclobutane, having a molecular weight of at least 10,000 may be used in accordance with this invention to produce compositions suitable for coating in accordance with this invention. However, the higher the molecular weight of the polymer, the better the general physical properties. Hence, higher molecular weight polymers are generally preferred for the coating compositions used in this invention. Because the molecular weight of the higher molecular weight polymers is not as easily or accurately determined, it is simpler to define the most useful polymers in terms of their specific viscosities. Any polymer having a specific viscosity, when measured as a 1% solution in cyclohexanone at 50° C., of at least about 0.3 may be used for the coating compositions used in this invention.

The 3,3-bis(chloromethyl)oxetane polymers having molecular weights of 10,000 and above may be prepared by contacting 3,3-bis(chloromethyl)oxetane with boron trifluoride or its molecular complexes. The structural formula of 3,3-bis(chloromethyl)oxetane is as follows:

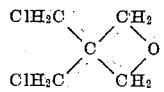

The polymerization reaction is generally carried out in the presence of an inert organic liquid diluent. Any inert organic solvent may be used as the diluent for the polymerization. However, highly polar organic solvents such as dioxane, etc., are preferably not used since they retard the polymerization by inactivating the catalyst. In addition, inorganic solvents such as liquid sulfur dioxide may also be used. The solvent should, of course, not be one which will cause chain termination since such a solvent, as, for example, an alcohol, would not then be inert. Exemplary of the solvents which may be used for carrying out the polymerization of 3,3-bis(chloromethyl)oxetane are the hydrocarbon solvents such as n-hexane, cyclohexane, benzene, toluene, etc., chlorinated solvents such as methylene chloride, chloroform, carbon tetrachloride, dichlorobenzene, etc., and nitro compounds such as nitropropane, nitrobenzene, etc. The catalyst may be added directly to the solution of 3,3-bis(chloromethyl)oxetane in inert diluent or it may be added as a solution, if desired. Boron trifluoride may be added as a gas or if used in the form of one of its molecular complexes with an ether, acid, or salt, as, for example, boron trifluoride etherate, etc., it may be added as a solution. The amount of catalyst which is added to the monomer may vary over a wide range but usually from about 0.01% to about 10% is adequate and preferably an amount of from about 0.1% to about 4% based on the monomer will be used. The amount of catalyst will, of course, vary with the type of polymerization reaction. For example, a lower range of catalyst concentration is required if the polymerization is carried out in the absence of a solvent and a higher concentration of catalyst is used if the polymerization is carried out in the presence of a diluent.

The temperature at which the polymerization of 3,3-bis(chloromethyl)oxetane is carried out may vary over a wide range and is, in general, dependent upon the solvent used, etc. In general, the molecular weight of the polymer produced increases with a decrease in temperature. Hence, for the production of higher molecular weight polymers, the temperature should be held below about 80° C. Lowering of the temperature is limited by the type of solvent and the solvent-monomer ratio employed in the reaction since the monomer may tend to crystallize out of solution and hence polymerization might not proceed as rapidly. In general, the polymerization reaction will be carried out, by selection of appropriate solvent, etc., at a temperature within the range of from about —80° C. to about 80° C., preferably at a temperature below about 30° C. and more preferably at a temperature below about 20° C. The length of time that the polymerization reaction is carried out will, in general, vary from about ½ hour to 10 hours. Although the reaction mixture may turn solid very quickly, higher conversions may be obtained by allowing it to "cure" for several hours, the polymerization continuing in what is apparently a solid phase. The polymerization reaction may, of course, be performed in a batchwise manner or as a continuous reaction.

The manner in which the polymer is isolated will depend upon the type of polymerization system used. For example, if a large amount of solvent was used as a diluent, the polymer may be separated simply by filtration. Otherwise, it is readily isolated by treating the reaction mixture with a liquid in which the polymer is insoluble but which will destroy the catalyst which was used for the polymerization reaction. Alcohols such as methanol, ethanol, isopropanol, etc., are suitable for this purpose. The polymer then may be separated by filtration.

Polymers of 3,3-bis(chloromethyl)oxetane of any desired molecular weight may be prepared by the proper selection of the polymerization reaction conditions, as, for example, control of temperature, etc. Another factor which enters into the molecular weight of the polymer obtained by this polymerization process is the purity of the monomer. As pointed out above, alcohols function as chain terminators in the polymerization reaction. Hence, if the monomer contains as an impurity any appreciable amount of chlorohydrin, the molecular weight of the polymer which is produced will be lowered. In the same way, the presence of alcohols, in general, and of any substantial amount of moisture should be avoided since they terminate the polymerization and also destroy the catalyst.

Another method of modifying the properties of the 3,3-bis(chloromethyl)oxetane polymer is by the incorporation of a copolymerizable monomer in the polymerization mixture so that a copolymer is produced. By this means it is often possible to modify the physical properties of the polymer in a desired manner for a specific use of the 3,3-bis(chloromethyl)oxetane polymer. For example, the softening point may be raised or lowered, flexibility increased, etc. Exemplary of the monomers that may be copolymerized with 3,3-bis(chloromethyl)oxetane are other 3,3-disubstituted oxetanes such as 3,3-bis(fluoromethyl)oxetane, 3,3-bis(bromomethyl)oxetane, 3-chloromethyl-3-methyloxetane, 3,3-dimethyloxetane, 3,3-bis(phenoxymethyl)oxetane, etc., and other copolymerizable monomers such as oxetane, and other substituted oxetanes.

The following examples will illustrate the preparation of the polymers of 3,3-bis(chloromethyl)oxetane from which the coating compositions used in this invention are prepared. All parts and percentages are by weight unless otherwise indicated.

*Example 1*

A solution of 1 part of 3,3-bis(chloromethyl)oxetane in 1 part of methylene chloride was treated at 0° C. with 2.0% of boron trifluoride based on the monomer (added as a 25% solution of boron trifluoride etherate in methylene chloride). After standing for 5-7 hours at that temperature, methanol was added to the reaction mixture and the polymer separated by filtration. The conversion of monomer to polymer amounted to 80%. This polymer had a specific viscosity (1% solution in cyclohexanone) of 0.375. This corresponds to a molecular weight of 26,000.

A sample of this polymer, mixed with 0.2% of 2,2-methylenebis(4-methyl-6-tert-butylphenol), was heated at its melting point for 5 hours in oxygen and found to be stable. There was no degradation of the polymer, decrease in molecular weight, or loss of chlorine.

*Example 2*

A solution of 1 part of 3,3-bis(chloromethyl)oxetane in 2 parts of chloroform was cooled to —35° C. and held at that temperature while a slow stream of nitrogen was passed through it, boron trifluoride being bled into the nitrogen stream at such a rate that the temperature elevation was maintained within one to two degrees. Within one-half hour the reaction mixture had become so viscous that it could no longer be stirred. It was then allowed to stand at —35° C. for 2 hours, after which the polymer was recovered by agitating the reaction mixture with methanol and filtering. The polymer was washed with methanol and dried in vacuo at 60° C. The white solid product so obtained had a softening point of 165–170° C. The specific viscosity of a 1% solution of it in cyclohexanone was 0.702 which corresponds to a molecular weight of about 42,000.

*Example 3*

The above example was repeated except that methylene chloride was used in place of chloroform and the temperature was held at —50° C. throughout the polymerization. The polymer so obtained had a softening point of about 165–170° C. and an intrinsic viscosity of 1.05 which is equivalent to a molecular weight of about 60,000 to 100,000.

*Example 4*

A solution of 1 part of 3,3-bis(chloromethyl)oxetane in 2 parts of methylene chloride was cooled to —50° C. and held at that temperature while a slow stream of nitrogen was passed through it, boron trifluoride being bled into the nitrogen stream at such a rate as to maintain the temperature within one to two degrees. The total amount of boron trifluoride used was 0.7% based on the weight of the monomer. At the end of 4 hours, the polymer was isolated as described in the above examples. The specific viscosity of a 1% solution of this polymer in cyclohexanone at 50° C. was 1.6.

*Example 5*

A solution of 1 part of freshly distilled 3,3-bis(chloromethyl)oxetane in 2 parts of methylene chloride was cooled to about —45° C. Boron trifluoride was bled into this solution as described in the foregoing examples until an amount of about 2.0% of boron trifluoride based on the weight of the monomer had been added. After 1½ hours the polymer was isolated. The conversion of monomer to polymer amounted to 74%. A 1% solution of this polymer in cyclohexanone at 50° C. had a specific viscosity of 2.3.

*Example 6*

A solution of 1 part of a carefully purified 3,3-bis(chloromethyl)oxetane in 2 parts of methylene chloride was cooled to —50° C. Boron trifluoride (1.0% based on the weight of the monomer) was then added as in the foregoing examples. After 1 hour the polymer was isolated. The specific viscosity of this polymer (1% solution in cyclohexanone at 50° C.) was 3.7.

*Example 7*

To a solution of 5.2 parts of 3,3-bis(chloromethyl)oxetane and 2.38 parts of 3,3-bis(fluoromethyl)oxetane in 14 parts of liquid sulfur dioxide cooled to —25° C. was added 0.12 part of gaseous boron trifluoride. After standing for 18 hours at that temperature, methanol was added and the polymer was separated by filtration, washed with methanol, and dried. The polymer obtained was a tough solid that softened at 110° C. and had a specific viscosity of 0.658 when measured as a 1% solution in cyclohexanone. It contained 29.2% chlorine and 11.1% fluorine.

*Example 8*

A mixture of 5.2 parts of 3,3-bis(chloromethyl)oxetane and 3.98 parts of 3,3-bis(bromomethyl)oxetane was polymerized as described in Example 7. The polymer so obtained was a powder having a melting point of 179–185° C. and a specific viscosity of 0.316 when measured as a 1% solution in cyclohexanone. It contained 26.6% chlorine and 26.9% bromine.

*Example 9*

A slow stream of nitrogen was passed into an agitated solution of 117 parts of 3,3-bis(chloromethyl)oxetane and 12 parts of 3-chloromethyl-3-methyloxetane. After cooling to —30° C., 3.88 parts of aqueous boron trifluoride was introduced into the nitrogen stream. Polymerization was then allowed to proceed at that temperature for 4 hours after which 300 parts of methanol was added. The polymer was removed by filtration, washed with methanol, and dried. It was a powder having a melting point of 152–156° C. and a specific viscosity of 1.217 when measured as a 1% solution in cyclohexanone. It contained 43.6% chlorine.

*Example 10*

A slow stream of nitrogen was passed into a solution of 7.3 parts of dimethyloxetane and 95 parts of 3,3-bis(chloromethyl)-oxetane in 210 parts of liquid sulfur dioxide and cooled to —30° C. Gaseous boron trifluoride, 3 parts, was then added and the polymerization was allowed to proceed at that temperature for 5 hours. Methanol, 300 parts, was then added and the polymer was separated by filtration, washed with methanol, and dried. It was a powder having a melting point of 159–163° C. and a specific viscosity of 0.999 when measured as a 1% solution in cyclohexanone. It contained 42.0% chlorine.

While these polymers have a high degree of heat stability, they are subject to degradation when heated for long periods of time. Thus, if the coated surface is one that will be subjected to constant heat as in chemical reactors, piping for hot liquids, articles that require sterilization, etc., degradation of the polymer may occur resulting in the coating becoming brittle and cracking. Another type of degradation that may be encountered is that caused by exposure for long periods of time to light and particularly to ultraviolet light, as may be the case in many applications of these coatings, with the result that a considerable amount of discoloration may occur as well as loss in flexibility of the coating. Any such heat and/or light degradation may be avoided by the incorporation of a small amount of a phenolic stabilizer in the coating composition prior to coating the article. Any phenolic stabilizer or ester or ether thereof may be used in the preparation of the compositions of this invention. Some of these phenolic compounds or esters or ethers thereof are more effective as heat stabilizers while others are more effective as light stabilizers although in many instances the compound will act as both. It may, therefore, be desirable to use more than one of the phenolic stabilizers. While any phenol will exert some stabilization, the phenol will preferably contain at least one alkyl or cycloalkyl substituent, having at least 4 carbon atoms, or aryl substituent, or aralkyl substituent. Exemplary of the phenols, phenol esters, and phenol ethers that may be used as heat and/or light stabilizers for the polymers of 3,3-bis(chloromethyl)oxetane are the highly substituted phenols such as di-tert-butyl-p-cresol, o,p-diamylphenol, o- and p-tert-amylphenol, p-octylphenol, benzoyl resorcinol (i. e., 2,4-dihydroxybenzophenone), p-cyclohexylphenol and the similarly substituted alkyl naphthols, etc., alkylenebisphenols such as 2,2-methylenebis(4-methyl-6-tert-butylphenol), 2,6-bis[(2-hydroxy-5-methylphenyl)methyl]-p-cresol, p,p'-isopropylidenebisphenol, p,p'-sec-butylidenebisphenol, 4,4'-isopropylidene-bis-o-cresol, etc., esters of phenols such as resorcinol monobenzoate, hydroquinone monobenzoate, propyl gallate, etc., and ethers of phenols such as the monobenzyl ether of hydroquinone, and the epoxy resins produced by the reaction of epichlorohydrin with various bisphenols such as p,p'-isopropylidenebisphenol, p,p'-sec-butylidenebisphenol, 4,4'-isopropylidene-bis-o-cresol, etc. The amount of the stabilizer incorporated in the coating composition may be varied over a wide range and will depend upon the degree of stabilization desired, but, in general, an amount of from about 0.1% to about 10%, and preferably from about 1 to about 5% by weight of the polymer of these phenolic stabilizers will adequately protect the fabricated articles from the degrading effects of heat, light, etc. A larger amount of stabilizer may be used if desired, but generally is not necessary. Also effective as light stabilizers for the fabricated articles are inert materials such as fillers, pigments, etc.

Various other additives may be incorporated in the coating compositions used in this invention. For many purposes it may be desirable to incorporate various fillers, pigments, or other colorants, etc., not only as ultraviolet light screens but for coloring, etc. The amount of such materials which are added may, of course, be varied over a wide range. For example, for the preparation of colored materials, the amount of pigment, or other colorant such as dyes, added will obviously depend upon the degree or shade of color desired.

For some purposes it may be desirable to incorporate a plasticizer in the coating compositions used in this invention. Many of the phenolic stabilizers mentioned above will also function as plasticizers for the coating compositions used in this invention if used in a sufficient quantity, as, for example, when used in an amount of from about 5 to about 10% of the polymer weight. Any plasticizer that is compatible with the 3,3-bis(chloromethyl)-oxetane polymer may be incorporated in the coating compositions used in this invention. Exemplary of such plasticizers are the alkyl esters of carboxylic acids such as the alkyl stearates, oleates, sebacates, adipates, phthalates, etc., as, for example, amyl stearate, butyl oleate, di-2-ethylhexyl adipate, dibutyl sebacate, dioctyl phthalate, di-2-ethylhexyl phthalate, n-octyl n-decyl phthalate, glycerol triacetate, glycerol tripropionate, pentaerythritol diacetate dibutyrate, dipentaerythritol diacetate dipropionate dibutyrate, and the pentaerythritol tetraester of mixed $C_4$ to $C_9$ acids, polyesters such as the polyester of sebacic acid and ethylene glycol, phosphates such as tricresyl phosphate, cresyl diphenyl phosphate, 2-ethylhexyl diphenyl phosphate, hydrocarbon oils such as mineral oil, fluorinated chlorinated hydrocarbon oils, chlorinated diphenyl, o-chloronaphthalene, polyethers such as the solid polyethylene glycols sold under the trade name, Carbowax, and other polymeric materials such as styrene—acrylonitrile copolymers, polydimethyloxetane (polymerized 3,3-dimethyloxetane), etc.

Any method of applying the coating of the 3,3-bis-(chloromethyl) oxetane polymer to the substrate may be used. Coatings of the polymer composition may be applied from solution in a solvent for the composition, as, for example, cyclohexanone, isophorone, etc., by hot-brushing, spreading by means of a blade, spraying of the composition in molten form, flame-spraying, hot-spraying, airless atomization, etc. The solution viscosity and concentration of the material as applied to the substrate, where the coating is applied as a solution, are not critical but should be such as will give adequate flow and spreading at the temperature at which it is applied. In general, the concentration of the polymer in the solution will be from about 5% to about 30%, depending upon the viscosity of the polymer being used. Laminates may be prepared by building up the layers by coating each layer with a solution of the polymer or with molten polymer. They may also be formed by fusing layers of dry polymer between the material to be laminated. If a solution of the polymer was used in applying the coating composition, the bulk of the solvent should then be removed by drying in order to prevent blisters and roughness from developing during the subsequent higher temperature treatment. This predrying operation may be carried out by drying anywhere from several hours, usually 2 to 24 hours, at room temperature down to about 10 minutes at temperatures of 100–150° C.

After application of the coating to the article, the coating is fused to the substrate by heating, as, for example, by baking or flash-fusing, as with a flame, etc., at any temperature above the softening point of the polymer, i. e., about 180° C., and preferably within the range of from about 195° C. to about 210° C. The time and temperature of this fusion step are preferably kept at the minimum that will insure complete fusion, i. e., in essentially a molten state. Obviously, the time required for this fusion step will depend upon the substrate that is coated. For example, if the substrate were a thin sheet of copper, only a very short time would be required, whereas if the substrate were a heavy block of steel, a longer time would be required. Usually 3 to 10 minutes exposure at temperatures of around 200° C. is adequate. This fusing will remove any traces of solvent remaining, if one is used in the coating composition, provide better transparency in the case of clear coatings, and yield an even, glossy surface. It also improves the adhesion of the coatings to the substrate.

As pointed out above, the polymers of 3,3-bis(chloromethyl) oxetane when applied as a coating in accordance with this invention will adhere to paper, metal, glass, etc. Thus, these coating compositions may be used for coating or laminating, etc., wherever chemical resistance, protection from corrosion, imperviousness to liquids, etc., are desired. For example, paper cartons may be made water- and solvent-proof by applying a coating of such polymers, shatterproof glass may be prepared by applying a coating of such polymers, and excellent fire-resistant insulating materials may be prepared by coating mats of glass fibers, asbestos, etc. They are particularly useful for providing a protective coating for metal articles which are exposed to corrosive atmospheres or immersed in a medium which might attack the metal or otherwise be contaminated. These polymers, being inert and non-toxic, are particularly outstanding for use in coating metal cans used as food containers. The container and food processing industries have long sought for a material that could be used to replace tin, a metal that is costly and in short supply. Many attempts have been made in the past to use plastic film-forming materials for this purpose, but the polymers of 3,3-bis(chloromethyl)oxetane are the first such materials that have the necessary resistance to corrosion, etc., imperviousness to liquids, etc., and adherence to the metal from which the can is fabricated to completely eliminate the necessity of tin-plating the metal prior to applying the coating. In the preparation of these coated cans, the sheet metal from which the can is fabricated may be coated as described above with the polymer coating composition and the cans then cut and fabricated, in which case the seams may be sealed by fusion and pressing of the polymeric coating, or by the usual soldering and stripping procedures, etc. If the cans are prefabricated, they may be coated by spraying, dipping, or by any other coating methods and then fused as described above. Another method of lining the can with the polymeric coating is to blow a sack or bag formed from a film of the polymer into the can and then fuse, etc., to obtain a tightly adhered film on the inside of the can. Many other applications for the use of these polymers for coating articles by the process of this invention will be apparent to those skilled in the art.

The following examples will illustrate the fabrication of the new coated articles, including laminates, in accordance with this invention.

*Example 11*

A 15% solution of a 3,3-bis(chloromethyl)oxetane polymer having a specific viscosity of 1.7 (1% in cyclohexanone at 50° C.) and containing 0.5% of 2,2-methylenebis(4-methyl-6-tert-butylphenol) in hot cyclohexanone was cast with a doctor blade on a panel of bonderized steel, dried at 100° C., and subsequently fused for 10 minutes at 204° C. A coating 0.0015 inch in thickness was thus obtained. When the panel was bent over a tapered mandrel, there was no damage to the polymer coating.

Coatings of this same polymer solution were applied in the same way to glass, chromium-plated steel, and paper with equally excellent results.

*Example 12*

Laminated compositions of alternate layers of glass fibers and the polymer-stabilizer composition described in Example 11 were prepared by three different techniques.

(a) *Solution method.*—A hot cyclohexanone solution containing 22% of the stabilized polymer composition was poured over a mat of glass fibers, then a second mat was placed on top. The procedure was repeated until five layers of glass were built up. The assembly was clamped between two blocks of wood and dried for one hour at 100° C. It was then fused at 204° C. for 10 minutes.

(b) *Hot melt method.*—The molten polymer composition was extruded as a ½ inch ribbon at cylinder temperature of 260° C. onto small glass fiber mats, alternating glass and polymer until five layers of glass were present. The assembly was immediately clamped between blocks of wood, fused at 204° C. for 10 minutes, and then allowed to cool.

(c) *Dry polymer hot-pressed.*—A laminate built up of alternate layers of glass fiber, approximately 3 inches square, and dry, powdered stabilized polymer composition was placed between chromium-plated steel sheets on the lower platen of an electrically heated, hydraulic press. The upper platen was brought into light contact with the upper steel sheet and the polymer was allowed to fuse for 3–5 minutes at platen temperature of 220° C. The assembly was then compressed at about 110 p. s. i. and allowed to cool under pressure.

In all of the above cases a hard, strong laminate was obtained.

*Examples 13 and 14*

A 20% solution of a 3,3-bis(chloromethyl)oxethane polymer having a specific viscosity of 1.6 (1% solution in cyclohexanone at 50° C.) and containing 0.1% of 2,2-methylenebis(4-methyl-6-tert-butylphenol) in cyclohexanone was heated to 80–90° C. and cast by means of a doctor blade on panels of cold-rolled steel and of aluminum. The coatings were dried for one hour at 60° C. and then fused for 10 minutes at 204° C. The coating films were approximately 0.001 inch thick and had good adherence to the substrate.

*Example 15*

A solution was prepared containing 15% of a 3,3-bis-(chloromethyl)oxetane polymer having a specific viscosity of 1.7 (1% solution in cyclohexanone at 50° C.) and containing 0.075% of 2,2-methylenebis(4-methyl-6-tert-butylphenol), 0.525% of a commercial epoxy resin (a reaction product of epichlorohydrin, and p,p'-isopropylidenebisphenol) sold by Carbide and Carbon Chemical Company under the name of "Stabilizer A–5," in a solvent comprising 3 parts by weight of cyclohexanone and 1 part of xylene. This solution, maintained at a temperature of 80–90° C., was applied to bonderized steel panels by dipping the entire panel and withdrawing it at a uniform rate. The panels were dried and then fused at 200° C. for 10 minutes. The coating films were 0.0003 to 0.0005 inch thick and had good adherence to the metal.

*Example 16*

A 15% solution of a 3,3-bis(chloromethyl)oxetane polymer having a specific viscosity of 0.5 (1% solution in cyclohexanone at 50° C.) and containing 0.1% of 2,2-methylenebis(4-methyl-6-tert-butylphenol) and 0.4% of the epoxy resin described in Example 15, in cyclohexanone was prepared. This solution was sprayed at a temperature of 80° C. using a conventional hot-spray lacquer gun onto panels of bonderized steel and cold-rolled steel. The coatings were air-dried and then fused at 200° C. for 10 minutes. A second coat was then applied in the same manner, after which the coatings were again dried and fused. The coatings so obtained had a thickness of about 0.0008 inch. In both cases the coatings had good adhesion and good salt-spray resistance.

*Example 17*

Example 16 was repeated except that the solution was pigmented using 1 part of titanium dioxide for every 4 parts of the 3,3-bis(chloromethyl)oxetane polymer, so that the solution was approximately 16% solids. Two coats were applied as in that example to panels of bonderized steel. The coatings so obtained had a thickness of about 0.001 inch and had good adhesion and good salt-spray resistance.

What we claim and desire to protect by Letters Patent is:

1. A coated article, the coating of which is a fused film comprising a polymer of 3,3-bis(chloromethyl)oxetane, said polymer having a specific viscosity of at least about 0.3, when measured as a 1% solution of the said polymer in cyclohexanone at 50° C.

2. A coated article, the coating of which is a fused film comprising a polymer of 3,3-bis(chloromethyl)oxetane and a stabilizer therefor, said polymer having a specific viscosity of at least about 0.3, when measured as a 1% solution of the said polymer in cyclohexanone at 50° C.

3. A coated article wherein the substrate is metallic and the coating is a fused film comprising a polymer of 3,3-bis(chloromethyl)oxetane, said polymer having a specific viscosity of at least about 0.3, when measured as a 1% solution of the said polymer in cyclohexanone at 50° C.

4. A coated article wherein the substrate is cellulosic and the coating is a fused film comprising a polymer of 3,3-bis(chloromethyl)oxetane, said polymer having a specific viscosity of at least about 0.3, when measured as a 1% solution of said polymer in cyclohexanone at 50° C.

5. A coated article wherein the substrate is glass and the coating is a fused film comprising a polymer of 3,3-bis(chloromethyl)oxetane, said polymer having a specific viscosity of at least about 0.3, when measured as a 1% solution of the said polymer in cyclohexanone at 50° C.

6. A coated article wherein the substrate is metallic and the coating is a fused film comprising a polymer of 3,3-bis(chloromethyl)oxetane and a stabilizer therefor, said polymer having a specific viscosity of at least about 0.3, when measured as a 1% solution of the said polymer in cyclohexanone at 50° C.

7. A coated article wherein the substrate is cellulosic and the coating is a fused film comprising a polymer of 3,3-bis(chloromethyl)oxetane and a stabilizer therefor, said polymer having a specific viscosity of at least about 0.3, when measured as a 1% solution of the said polymer in cyclohexanone at 50° C.

8. A coated article wherein the substrate is glass and the coating is a fused film comprising a polymer of 3,3-bis(chloromethyl)oxetane and a stabilizer therefor, said polymer having a specific viscosity of at least about 0.3, when measured as a 1% solution of the said polymer in cyclohexanone at 50° C.

9. A metal container having as a lining a fused film of a coating comprising a polymer of 3,3-bis(chloromethyl)oxetane, said polymer having a specific viscosity of at least about 0.3, when measured as a 1% solution of the said polymer in cyclohexanone at 50° C.

10. A metal container having as a lining a fused film of a coating comprising a polymer of 3,3-bis(chloromethyl)oxetane and a stabilizer therefor, said polymer having a specific viscosity of at least about 0.3, when measured as a 1% solution of the said polymer in cyclohexanone at 50° C.

11. The process of coating articles with a coating composition comprising a polymer of 3,3-bis(chloromethyl)oxetane, having a specific viscosity of at least about 0.3, when measured as a 1% solution of said polymer in cyclohexanone at 50° C., which comprises applying said coating composition to the surface of the article and then fusing the coating by heating it to a temperature above the softening point of the polymer.

12. The process of coating articles with a coating composition comprising a polymer of 3,3-bis(chloromethyl)oxetane, having a specific viscosity of at least about 0.3, when measured as a 1% solution of said polymer in cyclohexanone at 50° C., which comprises applying said coating composition to the surface of the article and then fusing the coating by heating it to a temperature above about 180° C.

13. The process of coating articles with a coating composition comprising a mixture of a polymer of 3,3-bis(chloromethyl)oxetane, having a specific viscosity of at least about 0.3, when measured as a 1% solution of said polymer in cyclohexanone at 50° C. and a stabilizer therefor, which comprises applying said coating composition to the surface of the article and then fusing the coating by heating it to a temperature above about 180° C.

14. The process of coating articles with a coating composition comprising a mixture of a polymer of 3,3-bis(chloromethyl)oxetane, having a specific viscosity of at least about 0.3, when measured as a 1% solution in cyclohexanone and a stabilizer therefor, which comprises applying said coating composition to the surface of the article and then fusing the coating by heating it to a temperature of from about 195° C. to about 210° C.

15. The process of coating articles with a coating composition comprising a mixture of a polymer of 3,3-bis(chloromethyl)oxetane, having a specific viscosity of at least about 0.3, when measured as a 1% solution in cyclohexanone and a stabilizer therefor, which comprises applying a solution of said coating composition to the surface of the article and then fusing the coating by heating it to a temperature of from about 195° C. to about 210° C.

References Cited in the file of this patent

UNITED STATES PATENTS

| | | |
|---|---|---|
| 2,270,285 | Frolich | Jan. 20, 1942 |
| 2,330,333 | Brubaker | Sept. 28, 1943 |
| 2,462,048 | Wyler | Feb. 15, 1949 |